Nov. 1, 1927.
T. W. CASE
SOUND PRODUCING APPARATUS
Filed Nov. 17, 1925
1,647,504
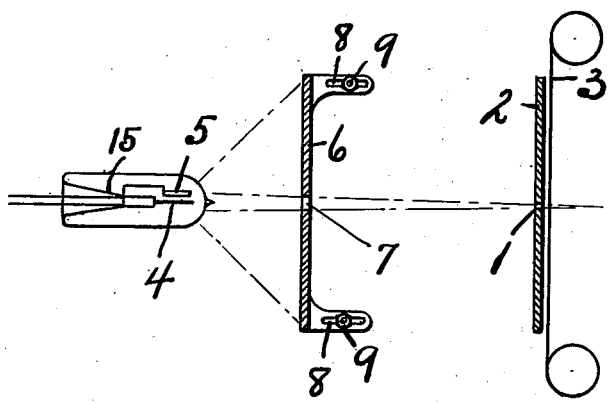
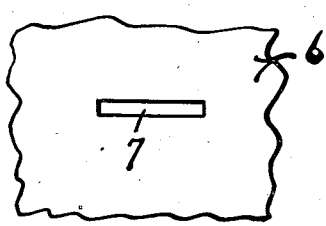
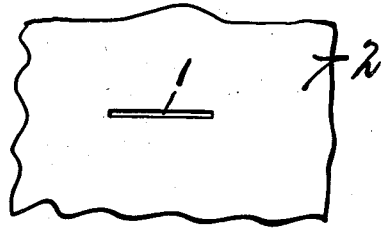
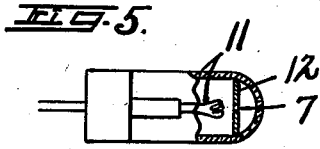
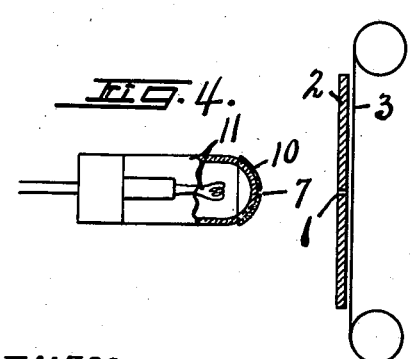
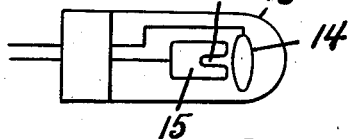

Patented Nov. 1, 1927.

1,647,504

UNITED STATES PATENT OFFICE.

THEODORE WILLARD CASE, OF AUBURN, NEW YORK.

SOUND-PRODUCING APPARATUS.

Application filed November 17, 1925. Serial No. 69,605.

This invention relates to certain new and useful improvements in apparatus for producing a record of light variations corresponding to sound wave variations.

In the production of a sound record, it is quite essential that the record shall be sharply defined if the reproduced sounds are to be clear and distinct, and at present in the production of such records it is customary to move a sensitive strip or film past an exceedingly narrow elongated slot, as for instance a slot .001 of an inch in width, and .1 of an inch in length with the film tightly held against the screen which contains the slot. Through this slot the light rays varied in accordance with sound waves pass to the film. Under these conditions of production due to the thickness of the transparent part of the film and to the inclination of the rays of light passing through the slot as a result of the fact that the source of light is considerably wider than the slot, there is a considerable spread of the rays after they pass through the slot with the result that the successive pictures are not sharply defined and may over-lap, and the object of this invention is the reduction of such spreading of the rays to a minimum, whereby more perfect operation in production or reproduction which is carried on through a similar slot, is effected.

Other objects and advantages relate to the details of the structure, all as will more fully appear from the following description taken in connection with the accompanying drawings in which:—

Figure 1 is a diagrammatic illustration of an embodiment of the invention.

Figure 2 is a plan view of a suitable light reducing slot.

Figure 3 is a view of the slot past which the film moves in relatively close association.

Figures 4, 5 and 6 illustrate modifications of the invention.

As above suggested in the production of a sound record a minute slot —1— is utilized which is adjacent the film, and may be formed in a screen —2—, the film being illustrated at —3—. This slot is of extremely minute width. In the producing of a photographic record of light variations corresponding to sound wave variations, any source of light may be utilized which can satisfactorily be varied in accordance with sound waves. Preferably, however, at present I utilize a lamp which includes a pair of spaced electrodes —4— and —5— and utilize the glow about the negative electrode for photographing purposes. The bulb —15— may contain any suitable gas at desired pressure, such a lamp being disclosed in my copending application Serial No. 719,098, filed June 10, 1924.

However, other suitable sources of light may be utilized in connection with the essential features of this invention, and where a light of suitable area is used, the inclination of the rays passing through the slot —1— is such as to cause some spread of the rays after passing through the slot so that the photographic record produced on the film —3— may be somewhat larger than the slot, and for the purpose of producing a more perfect and sharply defined record, I make use of a second screen —6— spaced from the screen —2—, but adjustable toward and from it so that the rays passing through it may be controlled to a certain extent, and the slot —7— may be of a width somewhat greater than the width of the slot —1—, and of a length substantially the same or greater, if desired, as spread caused by the length of the slot is not important in the production or reproduction of a film record. This slot —7— so cuts down the area of the rays which strike the slot —1— and pass through it to the film that the inclination of the rays is very slight and the spreading thereof after passing through the slot —1— is also extremely slight and practically negligible. The adjustment of screen —6— may be effected in any suitable manner, and for that purpose I have shown extensions on the screen formed with slots —8— which slide upon bolts —9—. Such structure is, however, purely illustrative.

The essential feature of this invention is the utilization of a second screen which cuts out a great many of the rays emanating from the source of light and permits the passage to slot —1— of only those rays which are substantially normal to the slot, whereby spreading of the rays beyond the slot —1— is substantially eliminated.

Various constructions and arrangements may be utilized for cutting out many of the rays emanating from the source, and various sources may be used for causing the passage to the slot —1— of those rays only which are practically normal to the slot and shall not have a spread greater than 30 degrees, and in Figures 4, 5 and 6, I have illustrated various modifications.

In Figure 4 there is shown a shield —10— for the lamp 11, which shield may be formed of sheet metal or may be an opaque coating of any kind upon the bulb and is provided with a slot —7— which permits the passage of certain of the rays from the lamp to the slot —1—.

In Figure 5 a shield —12— is illustrated within the lamp in the form of a transversely extending plate or disk provided with a slot —7— which permits the passage of a limited number of the rays emanating from the lamp to the slot —1—.

In Figure 6 a further modification is illustrated in the form of a cathode glow lamp comprising a bulb —13—, an anode —14— which may, as shown, be in the form of a ring, and a cathode —15— formed with a narrow elongated slot or groove —16—. In the drawing, the width of the slot is illustrated as substantially the same as the width of the slot —7— in Figure 2, and it may be of any length desired, the illustration here being somewhat diagrammatic. The bulb —13— contains an inert gas, preferably helium, but under such pressure that the glow is restricted to the groove or slot —16— in the cathode —15— so as to define a narrow elongated source of light of substantially the same character as the slot —7—, previously illustrated.

The cathode —15— is preferably provided with a coating comprising an alkaline earth metal, and except for the form of the cathode, is the same character of lamp described in my co-pending application heretofore referred to.

Altho slot —7— is here illustrated as of rectangular form it will be obvious that its form and shape are not essential as the requirement fulfilled by the slot is the reduction in the number of rays and the elimination of those having a certain inclination, and it may be preferable to utilize a circular or oval slot, or one of any desired form, and no restriction as to the form or shape of this slot is intended to be made so long as it reduces the rays in the manner described.

Altho I have shown and described a specific construction as illustrative of this invention, I do not desire to restrict myself to the details of form or arrangement of the same, as various changes may be made within the scope of the appended claims.

I claim:

1. In an apparatus for producing or reproducing a photographic record of light wave variations corresponding to sound wave variations, a screen having a slot of fixed area past which a film is adapted to move, a source of light rays, and a second screen spaced from the first-named screen and incapable of varying the fixed area of the first-named screen and having a slot which permits the passage to the slot in the first-named screen of only those rays from the source of light which are substantially normal to the slot in the first-named screen.

2. In an apparatus for producing or reproducing a photographic record of light wave variations corresponding to sound wave variations, a screen having a slot of fixed area past which a film is adapted to move, a source of light rays, and a second screen spaced from the first-named screen and incapable of varying the fixed area of the first-named screen and having a slot which permits the passage to the slot in the first-named screen of only those rays from the source of light which are substantially normal to the slot in the first-named screen, and means for adjusting the second screen toward and from the first-named screen.

In witness whereof I have hereunto set my hand this 5th day of November, 1925.

THEODORE WILLARD CASE.